No. 725,977. PATENTED APR. 21, 1903.
E. A. MAINGUET.
MECHANICAL MOVEMENT.
APPLICATION FILED APR. 8, 1902.
NO MODEL.
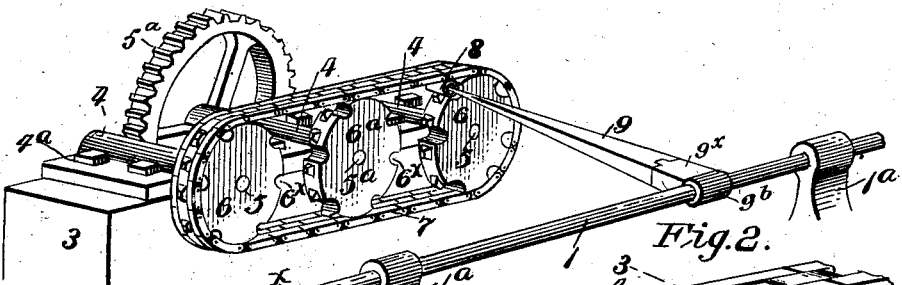
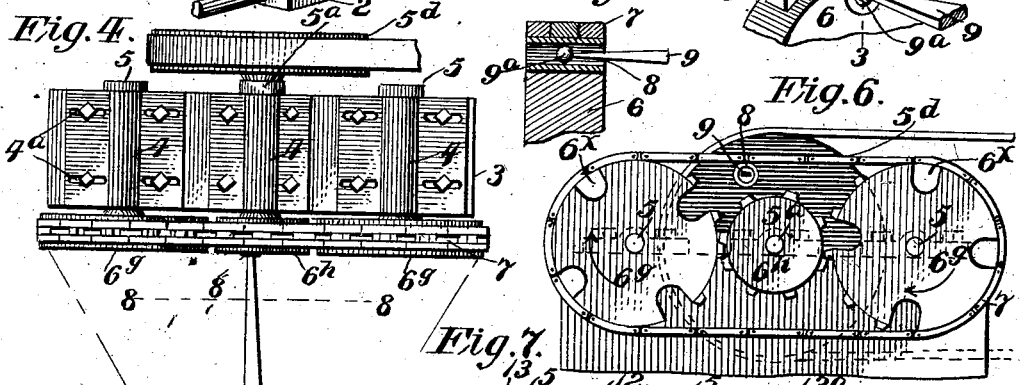
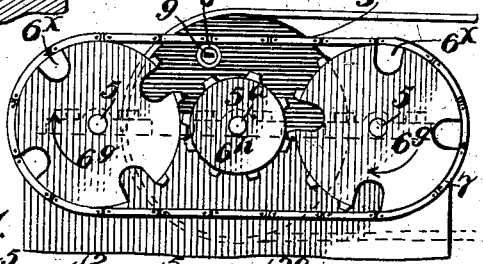
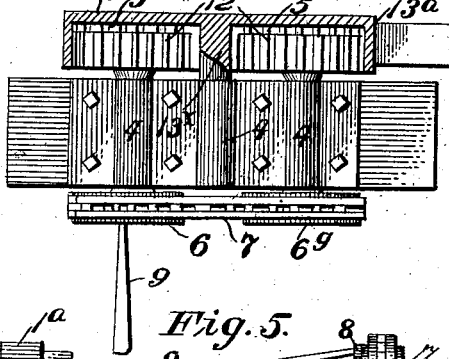
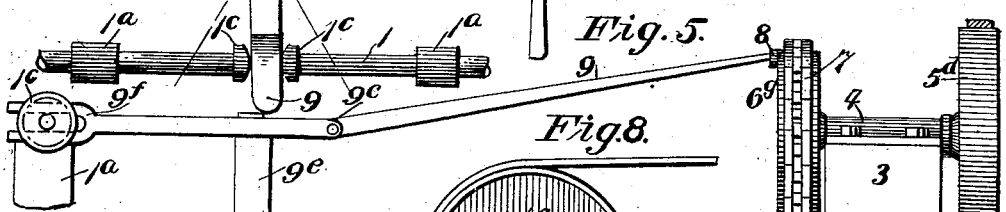
WITNESSES:
Guy V Worthington
Lee B Kenon
INVENTOR
E. A. Mainguet
BY
Fred G. Dieterich & Co.
ATTORNEYS

UNITED STATES PATENT OFFICE.

EDWARD A. MAINGUET, OF EVANGELINE, LOUISIANA.

MECHANICAL MOVEMENT.

SPECIFICATION forming part of Letters Patent No. 725,977, dated April 21, 1903.

Application filed April 8, 1902. Serial No. 101,917. (No model.)

*To all whom it may concern:*

Be it known that I, EDWARD A. MAINGUET, residing at Evangeline, in the parish of Acadia and State of Louisiana, have invented a new and Improved Mechanical Movement, of which the following is a specification.

My invention, which in its generic nature relates to improved machine elements, more particularly embodies a certain new and useful coöperative arrangement of parts especially designed for operating the cutter-bar of a mower or reaper and for transmitting one form of power or movement—for example, a reciprocating motion—into another motion— for example, a rotary—in an even, positive, and uniform manner and without jerks or intermittent pulls, such as is common in the ordinary run of power-transmitting mechanisms now in general use.

In its more specific nature my present invention has for its purpose to provide certain improvements in that type of mechanical movement shown in my Patents Nos. 687,639 and 691,644, dated November 26, 1901, and January 21, 1902, respectively; and it consists in the peculiar combination and novel arrangement of parts hereinafter first described and then pointed out in the appended claims, reference being had to the accompanying drawings, in which—

Figure 1 is a perspective view illustrating one form of my invention, the chain-wheels being shown as having a uniform diameter. Fig. 2 is a detail view illustrating the coöperative arrangement of the chain-wheel pocket, the chain, and the ball-and-socket joint for the shifting or power-transmitting arm hereinafter referred to. Fig. 3 is a detail cross-section of the same on the line 3 3 of Fig. 2. Fig. 4 is a plan view of my improved mechanical movement, a modification of the transmitting-arm being shown. Fig. 5 is a side elevation of the construction shown in Fig. 4. Fig. 6 is a face view of a further modification of my invention, hereinafter specifically referred to. Fig. 7 is a plan view, parts being in section, of another form of gear connection operable by my improved mechanical movement. Fig. 8 is a face view of a band-wheel, showing another arrangement of gear connections operable by my improved movement.

In the accompanying drawings I have illustrated several forms of gear mechanism capable of being coöperatively joined with my improved mechanical movement or power-transmitting means; but I desire it understood the same, with further slight changes as to position and form, might be used for the generic purposes intended with numerous other specific arrangements of power-transmitting gearing without departing from the scope of my invention or the appended claims.

In the several forms shown in the accompanying drawings I have shown as the main power-exerting means a reciprocating member, which may be a piston-rod. This member (designated by 1) is held to slide in bearings $1^a$ $1^a$. The member 1, to permit of the desired operation of the several connected parts, is formed of two parts, $x$ being that part slidable in the bearings $1^a$ $1^a$ and the other, $y$, being the member to which reciprocal movement is applied by any well-known means. The two members $x$ and $y$ join with a connecting head or union 2, the member $x$ having, as it were, a swiveled connection therewith, whereby to admit of a rocking motion of the said member $x$ as it is reciprocated for reasons presently explained.

In the simplest form of my invention, as shown in Fig. 1, a suitable base or support 3 is provided, on which is mounted three journal-boxes 4 4 4, and these boxes have elongated bolt-receiving apertures $4^a$ to permit of adjusting the several boxes to the positions desired. In each box 4 is journaled a stub-shaft 5 5 $5^a$, the one $5^a$ being central of the ones 5 5, and upon the outer end of each of said shafts is mounted a chain or sprocket wheel 6 6 $6^a$, spaced apart, but all of the same diameter. 7 designates an endless chain that engages the several wheels 6 6 $6^a$, as clearly shown in Fig. 1, by reference to which it will also be noticed the horizontal axial line of the three wheels 6 6 $6^a$ is in a plane with the axis of the reciprocable rod 1. Connected with the chain and secured to either the inner or outer surface is a tube or socket 8, disposed transversely of the chain, which has for its purpose to provide for a ball-and-socket joint for connecting the free end of the power-transmitting arm 9 with the chain. In the simplest form the arm 9 at its inner end is fixedly secured to the reciprocable rod-section $x$, and its inner end carries a ball-head $9^a$ for engaging the socket 8, as best shown in Figs. 3 and 4.

In the construction shown in Fig. 5 the central shaft $5^a$ carries a large gear $5^d$, which may be utilized for transmitting power (rotary or reciprocal) in any well-known manner. So far as described the manner in which my invention operates is explained as follows: Power in any well-known manner applied to the rod 1 to reciprocate the member $x$ in its bearings causes the arm 9 to also move reciprocally and impart motion in a continuous direction to the drive-chain 7. The said arm as it reaches the end of its movement in one direction (for example, to the right, as shown in Fig. 1) rocks downward to the plane of the horizontal axis of the several shafts 5 $5^a$ 5 as the rod 1 finishes the stroke to the right and downward below said plane as the rod 1 begins its return motion to the left, the same operation occurring when the rod 1 reaches the limit of its stroke to the left and begins again on its return movement to the right. By mounting the rod-section $x$ to rock in its bearings provision is made for a proper free action of the member 9, and to provide for an even action of the several ports, especially when the tube or socket 8 is on the under side of the chain, as in Figs. 1, 3, and 4, the several wheels 6 $6^a$ 6 have peripheral pockets $6^x$ to receive the said socket 8 as the same passes over the said wheels, as clearly shown in Fig. 3.

In Fig. 2 the same construction of parts appear in plan view as is disclosed in Fig. 1, with the exception that the rod 1 is shown as a continuous member and mounted for reciprocal motion in its bearings only, and to permit of a proper rocking action of the arm 9 said arm is hinged, as at $9^x$, to an outer portion $9^b$, fixedly joined to the shaft or rod 1, it being obvious by such construction rocking motion of rod 1 is not required.

In Fig. 5 another form of the transmitting member 9 is shown, and the same has its inner end $9^c$ hinged to the outer member $9^d$, fulcrumed to swing laterally on a fixture $9^e$, and the said outer member is forked, as at $9^f$, to embrace the rod 1 between two collars $1^c$ $1^c$. (See also Fig. 7.) In this latter form the socket 8 is shown attached to the under side of the chain.

In Fig. 7 is shown two large end chain-wheels $6^g$ $6^g$ and a small central gear-wheel $6^h$, and the several wheels intermesh, whereby power is applied to the central shaft $5^a$, which carries a band-wheel $5^d$. The wheels $6^g$ and $6^g$ have peripheral pockets to receive the socket 8 on the chain 7.

In Fig. 8 the central wheel is dispensed with and the two end wheels $6^g$ $6^g$ only used. The shafts 5 5 of said wheels $6^g$ $6^g$ each have a cog-wheel 12 12 on their inner end held to mesh with the internally-toothed rim $13^a$ of a flanged belt wheel or disk 13, having a stub-axle $13^x$, journaled on the standard midway the shafts 5 5.

From the foregoing description, taken in connection with the accompanying drawings, it is believed the complete operation and advantages of my invention will be readily understood. It will be noticed the chain has a straight motion at points between the end shafts 5 5 and a circular motion at both ends, and thus the forward speed will be divided by a vertical motion equal to the diameter of the end wheels 6 6 and a circular motion equal to one-half the circumference of the said wheels, and by reason of this slacking of the forward speed jerking and irregular pulling action are avoided.

The peculiar connection of the transmitting-bar 9 with the reciprocating member and the manner it joins with the chain provides for all of the varied motions of the said bar necessary to automatically accommodate itself to the several conditions required in passing or changing from one direction of motion to the other.

Having thus described my invention, what I claim, and desire to secure by Letters Patent, is—

1. The combination with the endless chain, a socket transversely disposed on the inner face of the chain and attached thereto, drive-sprockets around which the chain is passed, said sprockets each having a peripheral pocket to receive the chain-socket as it passes around the said sprocket-wheels, a reciprocating rod disposed in a plane parallel with the chain, and the arm comprising an outer member connected to the reciprocating rod to move therewith, and an inner member hinged to the outer member to swing in a plane at right angles to the direction of movement of the chain, said hinged member having its inner end slidably mounted in the chain-socket, as specified.

2. The combination with the endless chain, a pair of drive-sprockets of like diameter over which the chain passes, a gear-wheel between the said two sprockets and held in mesh with said sprockets, the end or chain sprockets having a series of spaced radial pockets in their periphery, a socket secured on the inner face of the chain transversely thereof, a reciprocating rod held in a plane parallel with the endless chain, an arm comprising an outer member fulcrumed to swing in a plane with the reciprocating rod, and having a slidable connection with the said rod, and an inner member hinged to the outer fulcrumed member to swing in a plane at right angles to the movement of said fulcrumed member, the inner end of said hinged member having a slidable connection with the pocket on the inner face of the endless chain, all being arranged substantially as shown and described.

EDWARD A. MAINGUET.

Witnesses:
A. C. BRAINARD,
R. D. WILSON.